United States Patent [19]
Collins

[11] Patent Number: 5,692,852
[45] Date of Patent: Dec. 2, 1997

[54] QUICK CONNECT SYSTEM FOR EXCAVATOR BUCKETS

[75] Inventor: Vearl L. Collins, Poway, Calif.

[73] Assignee: Entek Manufacturing Company, San Marcos, Calif.

[21] Appl. No.: 639,114

[22] Filed: Apr. 24, 1996

[51] Int. Cl.⁶ .................. F16B 7/08; E02F 3/96
[52] U.S. Cl. ............ 403/234; 37/468; 403/323; 403/386; 414/723
[58] Field of Search .............. 37/468; 172/272, 172/273; 403/234, 235, 323, 386, 398, 399; 414/723, 724

[56] References Cited

U.S. PATENT DOCUMENTS

| | | | |
|---|---|---|---|
| 1,563,406 | 12/1925 | Skinner | 403/234 X |
| 2,176,326 | 10/1939 | Brown et al. | 172/272 X |
| 2,934,803 | 5/1960 | Allen | 24/569 X |
| 4,437,791 | 3/1984 | Reynolds | 403/386 X |
| 4,700,437 | 10/1987 | Hoshino | 24/514 X |
| 4,769,933 | 9/1988 | Dejana | 414/723 X |
| 4,854,813 | 8/1989 | Degeeter et al. | 403/323 X |
| 5,145,313 | 9/1992 | Weyer | 37/468 X |

FOREIGN PATENT DOCUMENTS

| | | | |
|---|---|---|---|
| 405813 | 1/1991 | European Pat. Off. | 414/723 |
| 37302 | 5/1969 | Finland | 172/272 |
| 941573 | 4/1956 | Germany | 403/386 |
| 4-128437 | 4/1992 | Japan | 414/723 |
| 604806 | 4/1978 | U.S.S.R. | 403/234 |
| 630358 | 10/1949 | United Kingdom | 403/386 |

*Primary Examiner*—Kenneth J. Dorner
*Assistant Examiner*—Andrea Chop
*Attorney, Agent, or Firm*—Stanley A. Becker

[57] ABSTRACT

A quick connect system for attaching excavator buckets and other tools to the arm of a hydraulic excavator. The excavator bucket has a first and second mounting plate connected thereto in a spaced parallel relationship. Each mounting plate has a front and rear mounting assembly aligned to receive the front and rear pins respectively of the arm of the hydraulic excavator. Each mounting assembly has a U-shaped opening formed therein for receiving one end of one of the respective front and rear pins and has facilities for securing the respective pins to the mounting assembly.

12 Claims, 2 Drawing Sheets

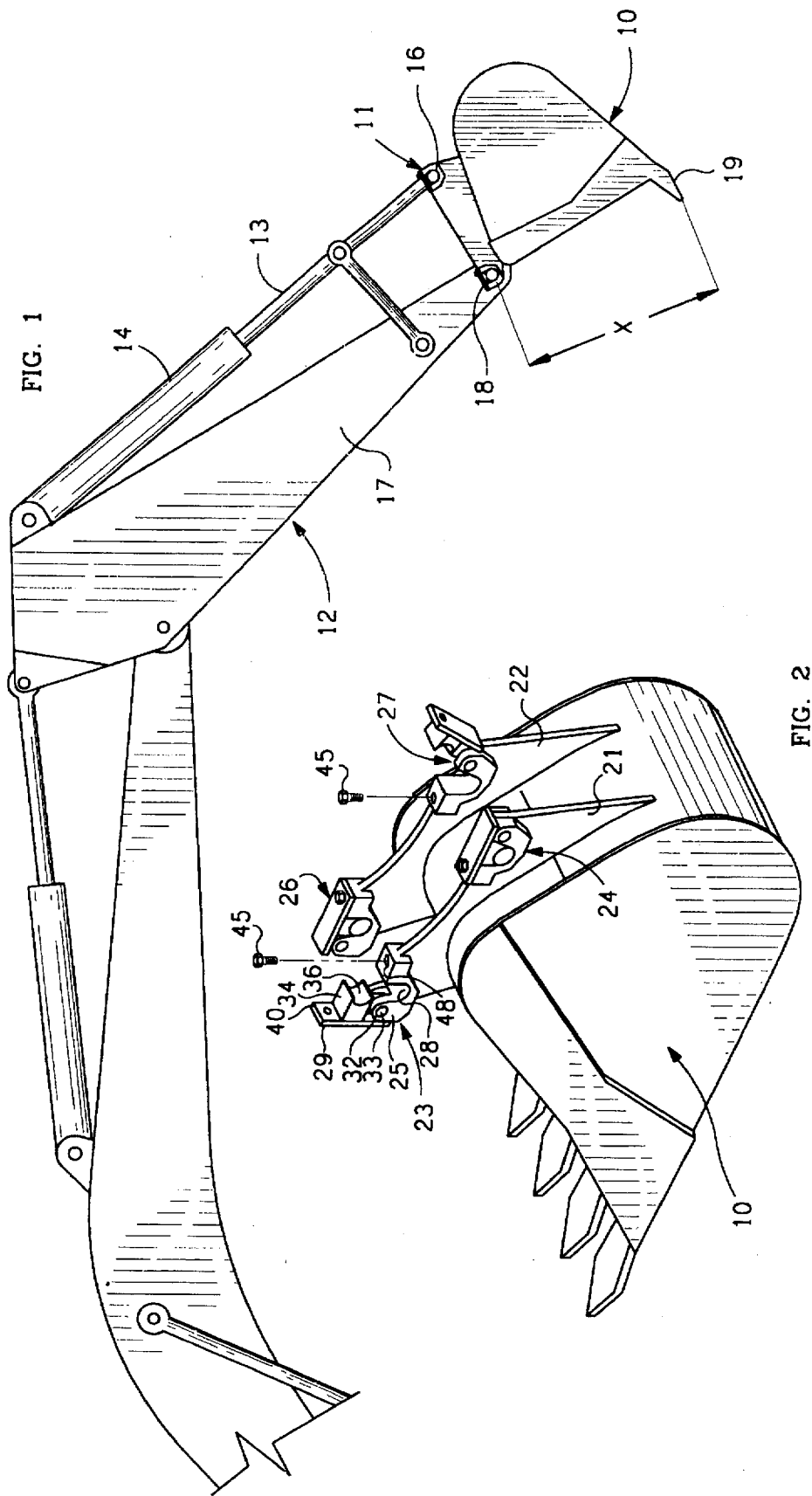

QUICK CONNECT SYSTEM FOR EXCAVATOR BUCKETS

BACKGROUND OF THE INVENTION

1. Field of the Invention

This invention relates to a quick connect system for excavator buckets and other tools which allow an excavator bucket to be connected quickly to the arm of a hydraulic excavator or front end loader or the like. In use, excavator buckets often need to be replaced several times during a shift at significant time and with substantial difficulty. The subject invention, has a plurality of split mounting assemblies, preferably hinged, which allow the pins which are attached to the arm of a hydraulic excavator to be easily placed into position into the split mounting assemblies fixed to an excavator bucket. A cover plate which can be hinged or pivotally mounted on each mounting assembly, is bolted into place to fix the pin securely to the excavator bucket.

2. Description of Related Art

Conventional buckets typically have a pair of plates having apertures or openings through which a pair of large pins are driven to connect the bucket to a hydraulic arm. Each pin goes through a bushing in the hydraulic arm as well as the openings in the plates attached to the bucket. The problem with attaching conventional excavator buckets to the arm of an excavator is that the pins must be driven through the opening in one mounting plate through the bushing in the arm of the excavator and then through the opening in the other mounting plate to attach the bucket. Any misalignment causes great difficulty in attaching the bucket to the arm. Further, it is difficult to align the holes in the plates of the heavy excavator buckets with the bushing and the pin so that the pin can be driven through without galling or scoring the openings. To enable insertion and removal of the pins, there has to be significant tolerances in the holes in the plates. These tolerances cause wear over time. The subject invention clamps the pin securely so that it does not move within the mounting assembly and little or no wear occurs between the pin and the opening. Considerable effort must also be used to drive the pins out of the openings. In use, buckets may need to be replaced several times per day and it usually takes 25 to 30 minutes to change a conventional bucket. With the quick connect system of this invention, time is minimized and the changing of buckets is greatly facilitated.

Dejana U.S. Pat. No. 4,769,933 discloses a snow plow assembly for a payloader that has a pair of quick connect pin units for connecting a snowplow blade in front of an excavator bucket.

Arnold U.S. Pat. No. 5,332,353 discloses a quick coupler for excavation equipment. This patent discloses a latch mechanism which allows an excavator bucket to be coupled to heavy construction equipment.

Lenertz et al. U.S. Pat. No. 4,436,477 discloses a quick attachment carrier assembly with latch hooks for engaging a bucket or the like to the arm of a front end loader.

Kaczmarczyk et al. U.S. Pat. No. 4,986,722 discloses a mounting structure for a loader attachment that includes a spring loaded latching pin for securing the pin of a hydraulic arm to the bucket.

Tibbatts et al. U.S. Pat. No. 5,141,385 discloses an implement attachment coupler in which each pin is held in the end of its respective loader arm by a spring loaded latch.

McCain U.S. Pat. No. 4,397,604 also discloses a releasable mechanism for attaching a bucket to a backhoe which includes latching means.

None of the foregoing have suggested a simple and inexpensive solution to the easy connection of excavator buckets to arms of hydraulic excavator equipment. Each of these typically add mechanisms or structure to the end of the hydraulic arm which adds weight and increases the pin-to-tip radius, which in turn increases the breakout force required to move the bucket through the material to be excavated. The subject invention does not adversely effect the breakout force and also does not add weight to either the bucket or the arm as the foregoing prior art systems have done. Furthermore, the subject invention requires no latching mechanisms.

Excavators are rated in lifting capacity and breakout force. Adding weight by adding any of the latching mechanisms of the prior art devices, decreases the lifting capacity of the machine. The breakout force is the force required to move the bucket through the material to be excavated. The longer the pin-to-tip radius, the more breakout force is required. By maintaining the pin-to-tip radius specified by the manufacturer and by avoiding any weight increase, the performance of the excavator is optimized.

SUMMARY OF THE INVENTION

The present invention fills the need for a simple, inexpensive, fool proof system for connecting and disconnecting excavator buckets and other tools to the arm of a hydraulic excavator or other machine. The present invention includes an excavator bucket or other tool which has a pair of mounting plates welded or otherwise connected parallel to and spaced apart from each other on the top of the bucket. Each mounting plate has a pair of split mounting assemblies or saddle blocks mounted to it. A front mounting assembly of one plate is aligned with a front mounting assembly of the other plate. Similarly, a rear mounting assembly of one plate is mounted in alignment with a rear mounting assembly of the second plate. Each mounting assembly on each mounting plate has a curved or U-shaped portion for receiving a pin on the excavator arm. A cover plate is hinged or pivotally mounted so that a wedge block mounted to the cover plate engages the top portion of the pin. The hinged cover plate is then affixed with a bolt to securely hold the pin to the excavator bucket. It generally takes no more than 10 minutes to detach or attach a bucket to an excavator arm using the system of this invention. In another embodiment of the invention, the cover plate of the mounting assembly could be bolted in place using a plurality of bolts instead of one. However, it has been found that using a hinged a pivotal connection and one bolt provides a stronger connection as well as decreasing the amount of time necessary to complete the installation or removal of the tool from the arm of the machine. In use of the subject invention, the pins remain in the excavator arm and are not removed when replacing a bucket.

Furthermore, the subject invention is mounted to the excavator bucket so that no changes or modifications are required to the hydraulic arm. This means that any excavators and other hydraulic machines can be utilized with this invention with no additional modification.

It typically takes from 15 minutes to 1 hour to change a conventional bucket. Pins often weigh between 75 pounds to 400 pounds and have a diameter from 50 millimeters to 130 millimeters and are from 12 inches to 3 feet in length. With the subject invention, it usually takes five to ten minutes to replace a bucket.

Further aspects of the present invention will become apparent from the following detailed description when considered in conjunction with the accompanying drawings. It should be understood, however, that the detailed description in the specific examples, while representing the preferred embodiments, are given by way of illustration only.

BRIEF DESCRIPTION OF THE DRAWINGS

FIG. 1 is a side elevational view illustrating an excavator bucket having a quick connect system in accordance with the subject invention attached to a hydraulic arm of an excavator.

FIG. 2 is a perspective view of an excavator bucket having a quick connect system with a hinged cover plate in accordance with the subject invention.

DETAILED DESCRIPTION OF THE INVENTION

Figure 3:
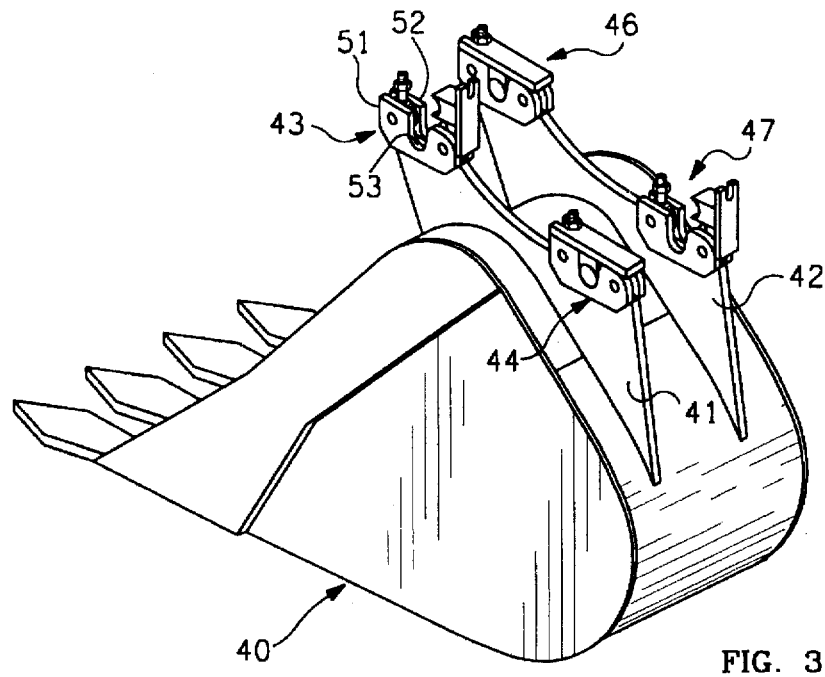
FIG. 3 is a perspective view of an alternative embodiment of a quick connect system in accordance with the subject invention.

The following description is of the best presently contemplated modes of carrying out the invention. This description is made for the purpose of illustrating the general principles of the invention and should not be taken in a limiting sense.

In accordance with the present invention there is shown in FIG. 1, an excavator bucket generally designated as 10, which is connected by the quick connect system of this invention generally designated as 11, to the arm 12 of a hydraulic excavator (not shown).

The arm 12 includes a dipper or link 13 which is connected to a hydraulic cylinder 14. One end of the dipper or link 13 is connected to a bushing surrounding the central portion of rear pin 16. A stick or link 17 is connected to a bushing surrounding the central portion of a front pin 18. Each of the pins in connected to the quick connect system of this invention as described hereinafter. Actuation of the hydraulic cylinder 14 causes the bucket 10 to rotate through the material to be excavated. It can be seen in FIG. 1 that the pin-to-tip radius "X" is the dimension between the front pin 18 and the tip 19 of the excavator bucket. This dimension is an important dimension because the longer the pin to tip radius, the more breakout force required. Accordingly, keeping this radius small by not adding any latching mechanisms in between the bucket and the arm, allows maximum performance of the excavator machine.

Referring to FIG. 2 there is shown, an excavator bucket 10 that has a pair of mounting plates 21 and 22 welded thereto in parallel spaced relationship. Mounting plate 21 has a front split mounting assembly generally designated as 23 and a rear split mounting assembly generally designated as 24 formed or welded therein.

Mounting plate 22 has a front split mounting assembly generally designated as 26 and a rear split mounting assembly generally designated as 27 also formed or welded therein.

Each split mounting assembly 23, 24, 26 or 27 includes a saddle block portion 25 welded to its respective mounting plate. The saddle block 25 has a curved or U-shaped opening 28 formed therein which is complementary to the diameter of the pin 16 or 18 which is attached to the excavator arm. A cover plate 29 is hinged or pivotally connected to the saddle block 25 and includes a wedge block 34 and a projection 32 (see FIG. 4) welded thereon. The wedge block 34 has a concave opening 36 formed therein which fits about the pin 18 when the wedge block is rotated about pin 33. The projection 32 has a hole therethrough through which a pin 33 is mounted to pivotally connect the cover plate 29 to the mounting assembly 23. The free end of the cover plate 29 has a hole 40 therein through which a bolt 45 is inserted to engage a threaded hole 48 in the saddle block 25 to secure the cover plate 29 to the saddle block 28 and securely grip the pin 18.

Figure 4:
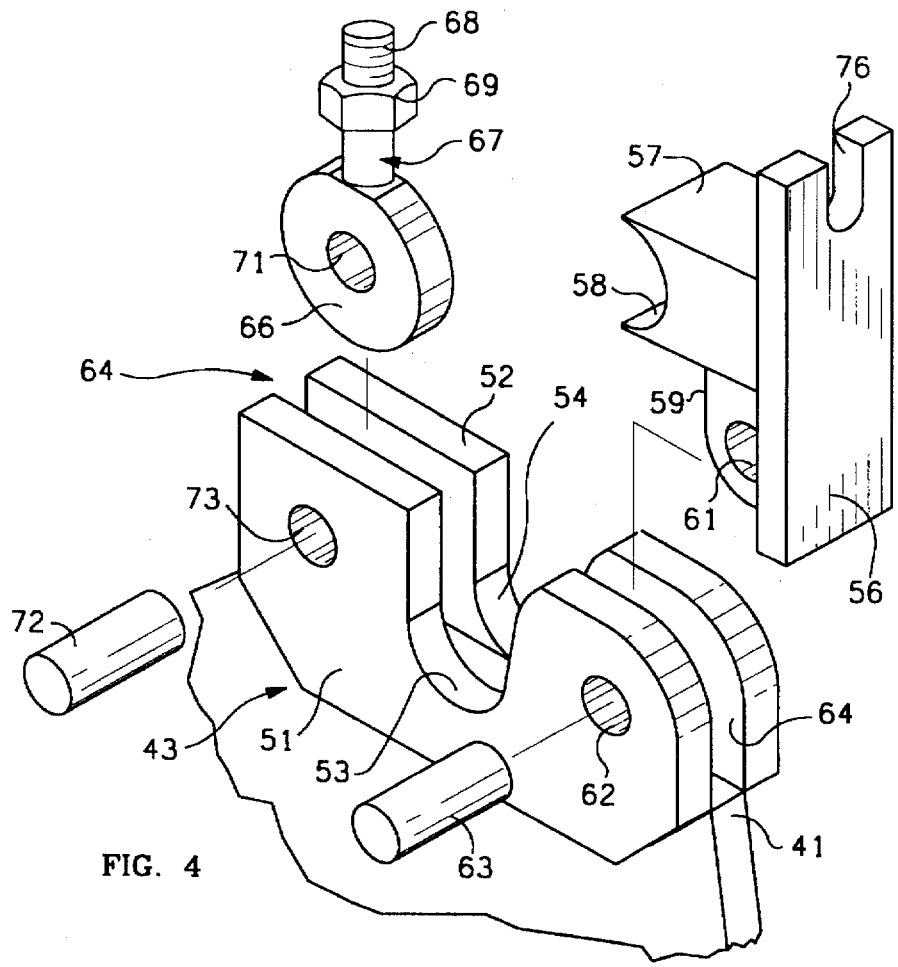
FIG. 4 is an enlarged exploded view of the mounting assembly of the quick connect system of FIG. 3.

Referring to FIGS. 3 and 4, there is shown a preferred embodiment of this invention which includes an excavator bucket generally designated as 40 that has a pair of mounting plates 41 and 42 welded thereto in parallel spaced relationship. Mounting plate 41 has a front split mounting assembly generally designated as 43 and a rear split mounting assembly generally designated as 44 welded thereto. Mounting plate 42 has a front split mounting assembly generally designated as 46 and a rear split mounting assembly generally designated as 47 also welded thereto. Each mounting assembly includes a pair of U-shaped plates 51 and 52 welded to the mounting plates 41 and 42 respectively. Each U-shaped plate or saddle block 51 and 52 has a curved or U-shaped opening 53 and 54 formed therein. Each mounting assembly has a cover plate 56 which is connected to a wedge block 57 that has a concave portion 58 formed in the end thereof. The cover plate 56 also has a projection 59 welded thereto which has a hole 61 formed therein. Hole 61 is aligned with a pair of holes 62 in the rearward end of the U-shaped plates 51 and 52. A pin 63 pivotally connects the cover plate assembly 56 to the mounting assembly 43. The front end of the mounting assembly 43 has a space 64 for receiving the flat circular end 66 of a pivot bolt 67 having a threaded end 68 on which a bolt 69 is connected. The end 66 of the pivot bolt 67 has a hole 71 therethrough for receiving a pin 72 which is placed through holes 73 in the plates 51 and 52 to pivotally mount the pivot bolt to the mounting assembly 43. The top plate 56 has a slot 76 formed therein to receive the threaded end 68 of the pivot bolt 67 to enable the cover plate to be securely fastened to the mounting assembly 43.

In use, the pin 18 which is attached to the excavator arm is positioned above the U-shaped openings 53 and 54 in the front split mounting assemblies 43 and 46. The excavator arm guides the pin 18 downwardly. When the pin is positioned within the U-shaped openings 53 and 54 of each mounting assembly, the cover plate 56 is rotated to move wedge block 57 into engagement with the pin 18 so that the pin is tightly and securely held between the concave surfaces 58 and the bottom 53 and 54 of the U-shaped plates 51 and 52. The pivot bolt 67 is rotated toward the cover plate 56 into the slot 76 in the cover plate. The nut 69 is secured against the cover plate 56 to hold the pin 18 in place. Similarly, the rear pin 16 is connected to the rear mounting assemblies 44 and 47.

Because forces acting on the bucket when in use are directed substantially rearwardly, it has been found that the split mounting assembly is preferably hinged on the rearward side of each split mounting assembly. The wedge block of each split mounting assembly secures the pin from any looseness or movement and prevents wear. While the subject split mounting assembly has been described in connection with a hydraulic excavator, it can also be used for the quick attachment of tools to machines, such as backhoes, front end loaders, bulldozers and the like. While reference has been made to using the split mounting assembly on excavator buckets, it can also be used on other tools such as compaction wheels and other similar devices.

The present invention has now been described in terms of certain preferred embodiments and exemplified with respect thereto, one skilled in the art will readily appreciate the various modifications, changes, omissions and substitutions that may be made without departing from the spirit and the scope thereof. It is intended that the present invention be limited solely by the scope in the following claims:

What is claimed is:

1. A quick connect system which attaches a tool to the end of an arm of a hydraulic machine, which end has a front and a rear pin transversely connected thereto comprising:

a first and a second mounting plate connected to the top of the tool in a spaced parallel relationship;

each mounting plate having a front and a rear mounting assembly, said front mounting assembly of said first mounting plate being aligned with the front mounting assembly of said second mounting plate to receive the front pin on said arm, said rear mounting assembly of said first mounting plate being aligned with the rear mounting assembly of said second mounting plate to receive the rear pin of said arm;

each mounting assembly including a saddle block with a U-shaped opening formed therein for receiving one end of one of a respective front and rear pin and means for closing the U-shaped opening of the saddle block and for securing the respective pin therein.

2. A quick connect system as set forth in claim 1 wherein said closing and securing means comprises a cover plate having one end pivotally mounted to one side of said saddle block and a wedge block attached to an underside of the cover plate and formed to fit within said U-shaped opening, said wedge block having a concave opening formed in an end thereof to engage the top of the respective pin positioned in said U-shaped opening; and means for securing the other end of the cover plate to said saddle block to secure said respective pin to said saddle block.

3. A quick connect system as set forth in claim 2 wherein said wedge block is capable of preventing said respective pin from movement within said saddle block.

4. A quick connect system as set forth in claim 2 wherein the tool has a front end and a rear end and wherein the rear mounting assemblies of said first and second mounting plates each have their respective cover plates pivotally connected on a side of each respective saddle block which faces the rear end of said tool.

5. A quick connect system as set forth in claim 4 wherein the front mounting assemblies of said first and second mounting plates each have their respective cover plates pivotally connected on a side of each respective saddle block which faces the rear end of said tool.

6. A quick connect system as set forth in claim 2 wherein the other end of said cover plate has a slot formed therein and said means for securing the other end of said cover plate to said saddle block comprises a pivot bolt having one end pivotally connected to said saddle block and its other end threaded, said threaded end rotatable into the slot of said cover plate and extending therethrough; and a nut for engaging said threaded end of the pivot bolt securing the cover plate to said saddle block.

7. A quick connect system as set forth in claim 6 wherein said pivotally connected end of said pivot bolt comprises a round block having an aperture therethrough.

8. A quick connect system as set forth in claim 1 wherein said closing and securing means comprises a cover plate secured to said saddle block over said U-shaped opening, said cover plate having a wedge block connected to an underside of the cover plate and formed to fit within said U-shaped opening and engage the respective pin positioned therein.

9. A quick connect system as set forth in claim 1 wherein said saddle block of each mounting assembly comprises:

a U-shaped plate welded to each side of the mounting plate having an opening formed therein which is aligned with the opening in the U-shaped plate on the other side of said mounting plate.

10. A quick connect system as set forth in claim 1 wherein said saddle block of each front mounting assembly comprises at least one U-shaped member welded to its respective first or second mounting plate, the U-shaped member welded to said first mounting plate having its U-shaped opening aligned with the U-shaped opening in the U-shaped member welded to said second mounting plate.

11. A quick connect system as set forth in claim 10 wherein said saddle block of each rear mounting assembly comprises at least one U-shaped member welded to its respective first or second mounting plate, the U-shaped member welded to said first mounting plate having its U-shaped opening aligned with the U-shaped opening in the U-shaped member welded, to said second mounting plate.

12. A quick connect excavator bucket comprising:

an excavator bucket;

a pair of mounting plates mounted to the top of the excavator bucket in spaced apart parallel relationship;

each mounting plate having a forward and a rear mounting assembly for receiving a forward and a rear pin attached to the arm of a hydraulic machine;

each mounting assembly having a U-shaped opening formed therein for receiving one end of one of a respective forward and rear pin and means for closing the top of the U-shaped opening to secure the respective pin to the mounting assembly.

* * * * *